US011122089B2

(12) United States Patent
Yuan

(10) Patent No.: US 11,122,089 B2
(45) Date of Patent: Sep. 14, 2021

(54) AUTHORIZATION POLICY OPTIMIZATION METHOD AND APPARATUS, AND STORAGE MEDIUM

(71) Applicant: TENCENT TECHNOLOGY (SHENZHEN) COMPANY LIMITED, Guangdong (CN)

(72) Inventor: Zhe Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 119 days.

(21) Appl. No.: 16/285,290

(22) Filed: Feb. 26, 2019

(65) Prior Publication Data
US 2019/0190959 A1 Jun. 20, 2019

Related U.S. Application Data

(63) Continuation of application No. PCT/CN2017/114527, filed on Dec. 5, 2017.

(30) Foreign Application Priority Data
Dec. 7, 2016 (CN) .......................... 201611115873.2

(51) Int. Cl.
*H04L 29/06* (2006.01)
*G06F 21/60* (2013.01)
(Continued)

(52) U.S. Cl.
CPC .......... *H04L 63/205* (2013.01); *G06F 21/604* (2013.01); *H04L 63/105* (2013.01);
(Continued)

(58) Field of Classification Search
CPC ..... H04L 63/205; H04L 63/105; H04L 63/20; H04L 67/1002; H04L 41/28;
(Continued)

(56) References Cited

U.S. PATENT DOCUMENTS 9,246,945 B2* 1/2016 Chari ..................... G06F 21/604
10,911,428 B1* 2/2021 Roth ....................... H04L 63/08
(Continued)

FOREIGN PATENT DOCUMENTS

CN 101339591 A 1/2009
CN 103198361 A 7/2013
(Continued)

OTHER PUBLICATIONS

Chaisiri et al., "From Reactionary to Proactive Security: Context-Aware Security Policy Management and Optimization under Uncertainty," 2016 IEEE Trustcom/BigDataSE/ISPA Year: 2016 | Conference Paper | Publisher: IEEE.*
(Continued)

*Primary Examiner* — Roderick Tolentino
(74) *Attorney, Agent, or Firm* — Sughrue Mion, PLLC

(57) ABSTRACT

An authorization policy optimization method being performed by a computing device comprising at least one processor, includes receiving an authorization policy to be used to perform an authentication on a data access right of a user, obtaining authorization log information of a first preset authorization policy, from the authorization policy, extracting a log information feature, from the authorization log information, generating an authorization policy optimization model, using the log information feature, performing a policy reasonableness prediction on the authorization policy, using the authorization policy optimization model, to obtain a predicted reasonableness value corresponding to the authorization policy, and performing an optimization processing on the authorization policy, based on the predicted reasonableness value.

12 Claims, 10 Drawing Sheets

(51) Int. Cl.
*H04L 29/08* (2006.01)
*H04L 12/24* (2006.01)

(52) U.S. Cl.
CPC .......... *H04L 63/20* (2013.01); *H04L 67/1002* (2013.01); *G06F 2221/2141* (2013.01); *H04L 41/28* (2013.01)

(58) Field of Classification Search
CPC .............. H04L 12/1407; G06F 21/604; G06F 2221/2141; H04W 24/00; H04W 24/08
See application file for complete search history.

(56) References Cited

U.S. PATENT DOCUMENTS

| | | | |
|---|---|---|---|
| 2006/0271596 A1* | 11/2006 | Sabsevitz | G06F 16/10 |
| 2008/0195360 A1* | 8/2008 | Chiang | H04L 41/0893 |
| | | | 703/2 |
| 2012/0102361 A1* | 4/2012 | Sass | G06Q 10/0637 |
| | | | 714/37 |
| 2015/0163252 A1* | 6/2015 | Bhatti | G06F 21/45 |
| | | | 726/1 |
| 2015/0281279 A1* | 10/2015 | Smith | H04L 9/3247 |
| | | | 726/1 |
| 2015/0288718 A1* | 10/2015 | Pimenova | H04L 63/10 |
| | | | 726/1 |
| 2015/0304281 A1 | 10/2015 | Kasturi et al. | |
| 2016/0219077 A1* | 7/2016 | Pandya | H04L 63/20 |
| 2018/0097787 A1* | 4/2018 | Murthy | H04L 63/0236 |

FOREIGN PATENT DOCUMENTS

| | | |
|---|---|---|
| CN | 103810441 A | 5/2014 |
| CN | 104077532 A | 10/2014 |
| CN | 104462024 A | 3/2015 |
| CN | 106156558 A | 11/2016 |
| CN | 106161026 A | 11/2016 |
| CN | 106778303 A | 5/2017 |

OTHER PUBLICATIONS

Jaidi et al., "An Approach to Formally Validate and Verify the Compliance of Low Level Access Control Policies," 2014 IEEE 17th International Conference on Computational Science and Engineering Year: 2014 | Conference Paper | Publisher: IEEE.*

Tang Qing-Xin et al., "Data Resource Authorization Policy Evaluation Based on Log Data", Research and Development, Computer Systems & Applications, vol. 25, No. 6, 2016, pp. 265-268, 4 pages total.

International Search Report dated Mar. 6, 2018 issued by the International Searching Authority in International Application No. PCT/CN2017/114527.

Written Opinion dated Mar. 6, 2018 issued by the International Searching Authority in International Application No. PCT/CN2017/114527.

Communication dated Jun. 5, 2019 issued by the State Intellectual Property Office of People's Republic of China in counterpart application No. 201611115873.2.

* cited by examiner

AUTHORIZATION POLICY OPTIMIZATION METHOD AND APPARATUS, AND STORAGE MEDIUM

CROSS-REFERENCE TO RELATED APPLICATIONS

This application is a continuation application of International Patent Application No. PCT/CN2017/114527 filed on Dec. 5, 2017, which claims priority from Chinese Patent Application No. 201611115873.2, entitled "AUTHORIZATION POLICY OPTIMIZATION METHOD AND AUTHORIZATION POLICY OPTIMIZATION APPARATUS," and filed in the Chinese Patent Office on Dec. 7, 2016, which are incorporated herein by reference in their entireties.

BACKGROUND

1. Field

Methods and apparatuses consistent with embodiments relate to the Internet field, and in particular, to an authorization policy optimization method and apparatus, and a storage medium.

2. Description of Related Art

To conveniently control access to a resource, a resource server usually grants different rights to different users, to securely control resource access rights of the different users, that is, determine resources that can be accessed by users, determine an access manner of accessing a resource by the users, and the like.

Therefore, the resource server may need to manage, by using an authentication system, an access action performed on a resource by a user. Currently, cloud authentication systems have two authorization policy optimization solutions. First, an authentication system records all authentication actions as logs, and provides a log query interface, so that a user analyzes history authentication. Besides, the authentication system provides a latest access record of each service interface, and obtains, by screening, a service and an interface that are not accessed. This helps the user to make decisions by using the coarse-grained analysis.

An existing authentication system performs query and basic statistics collection and analysis operations on the basis of generating complete authentication logs, and guides a user to perform authorization policy optimization. Although this has guiding significance, only some obvious problems can be found and resolved because of excessively coarse granularity, and fine authorization policy optimization cannot be performed.

SUMMARY

An authorization policy optimization method being performed by a computing device including at least one processor, includes receiving an authorization policy to be used to perform an authentication on a data access right of a user, obtaining authorization log information of a first preset authorization policy, from the authorization policy, extracting a log information feature, from the authorization log information, generating an authorization policy optimization model, using the log information feature, performing a policy reasonableness prediction on the authorization policy, using the authorization policy optimization model, to obtain a predicted reasonableness value corresponding to the authorization policy, and performing an optimization processing on the authorization policy, based on the predicted reasonableness value.

An authorization policy optimization apparatus includes at least one memory configured to store computer program code, and at least one processor configured to access the at least one memory and operate according to the computer program code, the computer program code including policy receiving code configured to cause the at least one processor to receive an authorization policy to be used to perform an authentication on a data access right of a user, obtain authorization log information of a first preset authorization policy, from the authorization policy, and extract a log information feature, from the authorization log information. The computer program code further includes model generation code configured to cause the at least one processor to generate an authorization policy optimization model, using the log information feature, policy reasonableness prediction code configured to cause the at least one processor to perform a policy reasonableness prediction on the authorization policy, using the authorization policy optimization model, to obtain a predicted reasonableness value corresponding to the authorization policy, and optimization processing code configured to cause the at least one processor to perform an optimization processing on the authorization policy, based on the predicted reasonableness value.

A non-transitory computer-readable storage medium storing instructions that cause at least one processor of to receive an authorization policy to be used to perform an authentication on a data access right of a user, obtain authorization log information of a first preset authorization policy, from the authorization policy, extract a log information feature, from the authorization log information, generate an authorization policy optimization model, using the log information feature, perform a policy reasonableness prediction on the authorization policy, using the authorization policy optimization model, to obtain a predicted reasonableness value corresponding to the authorization policy, and perform an optimization processing on the authorization policy, based on the predicted reasonableness value.

DESCRIPTION OF EMBODIMENTS

Figure 1:
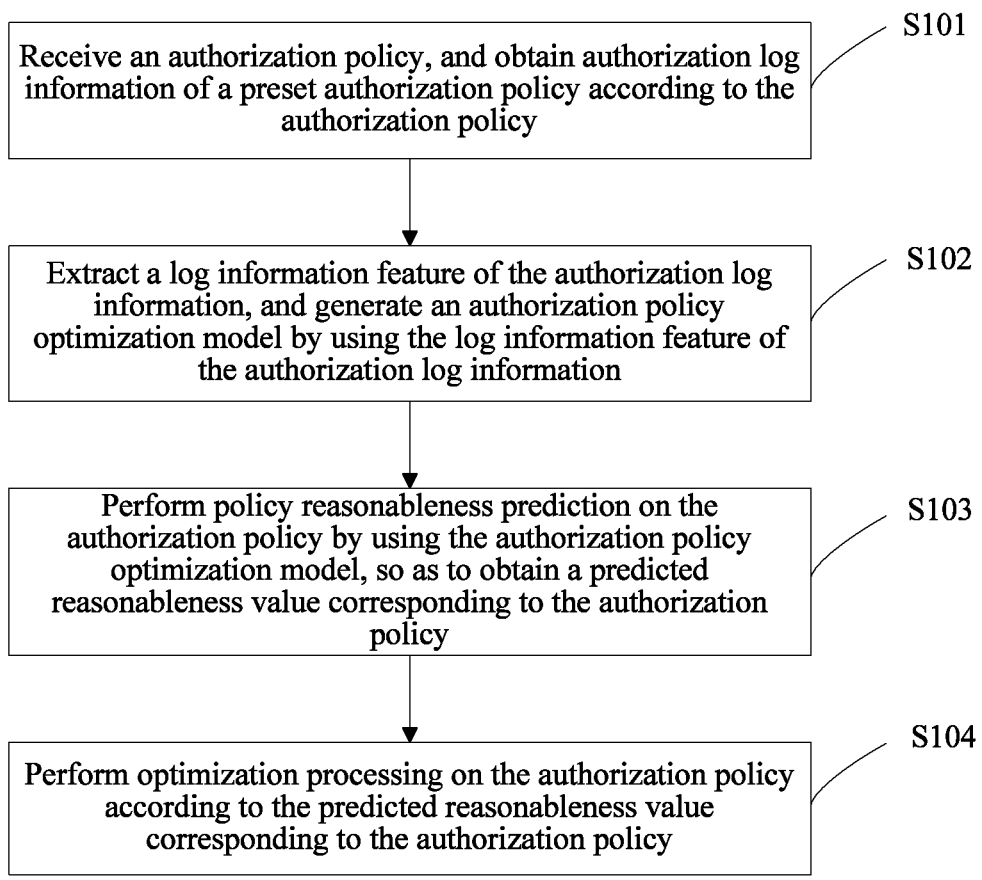
FIG. 1 is a flowchart of an authorization policy optimization method according to an embodiment.

Referring to the drawings, same components are represented by same component symbols. The principle of this application is described by using an example of an implementation in a suitable computing environment. The following description is based on the illustrated embodiment of this application, which should not be construed as limiting other embodiments of this application that are not described in detail herein.

In the description below, the embodiments of this application will be described with reference to steps and signs of operations that are performed by one or more computers, unless indicated otherwise. Therefore, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by a person skilled in the art. The data structures in which data is maintained are physical locations of the memory that have properties defined by the format of the data. However, while the principle of this application is being described in the foregoing text, it is not meant to be limiting as a person skilled in the art will appreciate that the various steps and operations described hereinafter may also be implemented in hardware.

The authorization policy optimization apparatus of this application may be used in computing devices of various data cloud platforms. The computing device may be an electronic authentication apparatus. The electronic authentication apparatus includes, but is not limited to, a wearable device, a personal computer, a server computer, a handheld or laptop device, a mobile device, a multiprocessor system, a small computer, a mainframe computer, and a distributed computing environment including any of the foregoing systems or devices. The electronic authentication apparatus of this application can implement reasonableness prediction on an authorization policy for accessing a data resource by a user and fine processing of authorization policy optimization, thereby improving an authorization operation success rate of the electronic authentication apparatus.

FIG. 1 is a flowchart of an authorization policy optimization method according to an embodiment. The authorization policy optimization method of this embodiment may be performed by using the foregoing computing device. The computing device may be an electronic authentication apparatus. The authorization policy optimization method of this embodiment includes:

Step S101: Receive an authorization policy, and obtain authorization log information of a preset authorization policy according to the authorization policy.

Step S102: Extract a log information feature of the authorization log information, and generate an authorization policy optimization model by using the log information feature of the authorization log information.

Step S103: Perform policy reasonableness prediction on the authorization policy by using the authorization policy optimization model, to obtain a predicted reasonableness value corresponding to the authorization policy.

Step S104: Perform optimization processing on the authorization policy according to the predicted reasonableness value corresponding to the authorization policy.

The following describes a procedure of steps of the authorization policy optimization method of this embodiment in detail.

In step S101, an authorization policy optimization apparatus receives an authorization policy inputted by a user. The authorization policy is a policy that the user wants to use to perform an authentication operation on a data access right of the user. However, the user does not know whether the authorization policy is reasonable and whether determining is incorrectly performed or is not performed excessively frequently.

Subsequently, the authorization policy optimization apparatus acquires authorization log information of a preset authorization policy according to the received authorization policy. The preset authorization policy herein refers to an authorization policy used to establish an authorization policy optimization model. Authorization log information of preset authorization policies may come from an authentication log of an authentication system. That is, history and current authentication logs of a current electronic authentication apparatus are used as reference. Alternatively, the authorization log information may be a service association log of a service server, that is, feedback of a final authorization status by the service server. For example, service data in the service association log of the service server may be accessed abnormally because the authorization policy is set unreasonably. Subsequently, step S102 is performed.

In step S102, the authorization policy optimization apparatus extracts a log information feature of the preset authorization policy obtained in step S101. The log information feature refers to an information feature that may be used to represent the preset authorization policy, and the log information feature includes a user feature, an action feature, an authorization policy feature, an authentication target value feature, and the like.

The user feature may include the user type, user activeness, and the like. The user type may be, for example, an ordinary user, an external user, cross-account and sub account, and the like. The user activeness may be the user data access frequency. The action feature may include an operation action interface, an operation action geographic location, an operation action type, an authentication type, and the like. The operation action type may be an item to which an operation resource belongs or a cloud service to which an operation resource belongs, and the like. The authentication type includes whether authentication succeeds. The authorization policy feature includes an authorization policy change frequency, an authorization policy quantity, a policy user matching relationship, a policy resource matching relationship, and the like. The policy user matching relationship may be a correspondence between a user and a policy, and the policy resource matching relationship may be a correspondence between a resource and a policy. The authentication target value feature includes whether an authentication result is correct, whether an authentication result changes, and the like.

Subsequently, the authorization policy optimization apparatus performs training to generate the authorization policy optimization model by using the extracted log information feature of the authorization log information. The authorization policy optimization model may perform policy reasonableness prediction on another authorization policy. Subsequently, step S103 is performed.

In step S103, the authorization policy optimization apparatus performs policy reasonableness prediction on the authorization policy by using the authorization policy optimization model generated in step S102, to obtain a quantitative policy validity probability, that is, a predicted reasonableness value corresponding to the authorization policy having a guiding effect. The authorization policy optimization model in this embodiment may be generated in real time. Therefore, the authorization policy optimization model may be constantly optimized with reference to time attenuation along with accumulation of the preset authorization policy. Subsequently, step S104 is performed.

In step S104, the authorization policy optimization apparatus performs optimization processing on the authorization policy according to the predicted reasonableness value corresponding to the authorization policy that is obtained in step S103. Specifics are as follows: If the predicted reasonableness value is less than or equal to a specified value, the user is prompted to perform optimization processing on the authorization policy, for example, modify a feature in the authorization policy, to increase the predicted reasonableness value of the authorization policy. If the predicted reasonableness value is greater than the specified value, it is prompted that the authorization policy is a reasonable policy, and an electronic authentication apparatus may directly perform an authentication operation on the user by using the authorization policy.

In this way, an authorization policy optimization process of the authorization policy optimization method in this embodiment is completed.

In the authorization policy optimization method in this embodiment, the authorization policy optimization model is generated in real time to perform reasonableness prediction on the authorization policy, and optimization processing is performed on the authorization policy according to the predicted reasonableness value of the authorization policy, thereby implementing fine processing of authorization policy optimization.

Figure 2:
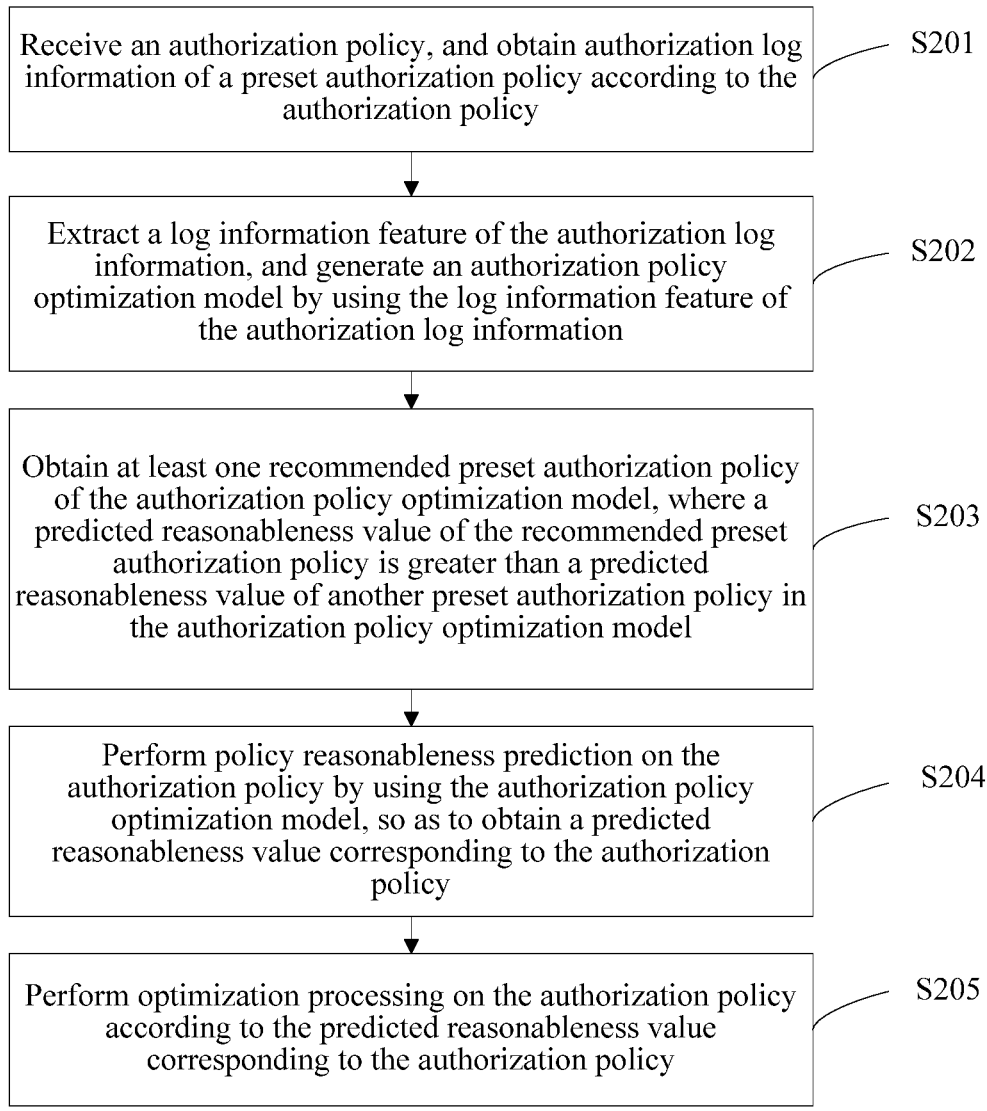
FIG. 2 is a flowchart of an authorization policy optimization method according to another embodiment.

FIG. 2 is a flowchart of an authorization policy optimization method according to another embodiment. The authorization policy optimization method of this embodiment may be performed by using the foregoing electronic authentication apparatus, and the authorization policy optimization method of this embodiment includes:

Step S201: Receive an authorization policy, and obtain authorization log information of a preset authorization policy according to the authorization policy.

Step S202: Extract a log information feature of the authorization log information, and generate an authorization policy optimization model by using the log information feature of the authorization log information.

Step S203: Obtain at least one recommended preset authorization policy of the authorization policy optimization model, in which a predicted reasonableness value of the recommended preset authorization policy is greater than a predicted reasonableness value of another preset authorization policy in the authorization policy optimization model.

Step S204: Perform policy reasonableness prediction on the authorization policy by using the authorization policy optimization model, to obtain a predicted reasonableness value corresponding to the authorization policy.

Step S205: Perform optimization processing on the authorization policy according to the predicted reasonableness value corresponding to the authorization policy.

The following describes a procedure of steps of the authorization policy optimization method of this embodiment in detail.

In step S201, an authorization policy optimization apparatus receives an authorization policy inputted by a user. The authorization policy is a policy that the user wants to use to perform an authentication operation on a data access right of the user. However, the user does not know whether the authorization policy is reasonable and whether determining is incorrectly performed or is not performed excessively frequently.

Subsequently, the authorization policy optimization apparatus acquires authorization log information of a preset authorization policy according to the received authorization policy. The preset authorization policy herein refers to an authorization policy used to establish an authorization policy optimization model. Authorization log information of preset authorization policies may come from an authentication log of an authentication system. That is, history and current authentication logs of a current electronic authentication apparatus are used as reference. Alternatively, the authorization log information may be a service association log of a service server, that is, feedback of a final authorization status by the service server. For example, service data in the service association log of the service server may be accessed abnormally because the authorization policy is set unreasonably. Subsequently, step S202 is performed.

In step S202, the authorization policy optimization apparatus extracts a log information feature of the preset authorization policy obtained in step S201. The log information feature refers to an information feature that may be used to represent the preset authorization policy, and the log information feature includes a user feature, an action feature, an authorization policy feature, an authentication target value feature, and the like.

Subsequently, the authorization policy optimization apparatus performs training to generate the authorization policy optimization model by using the extracted log information feature of the authorization log information. The authorization policy optimization model may perform policy reasonableness prediction on another authorization policy. For a step of generating the authorization policy optimization model, refer to FIG. 3.

Figure 3:
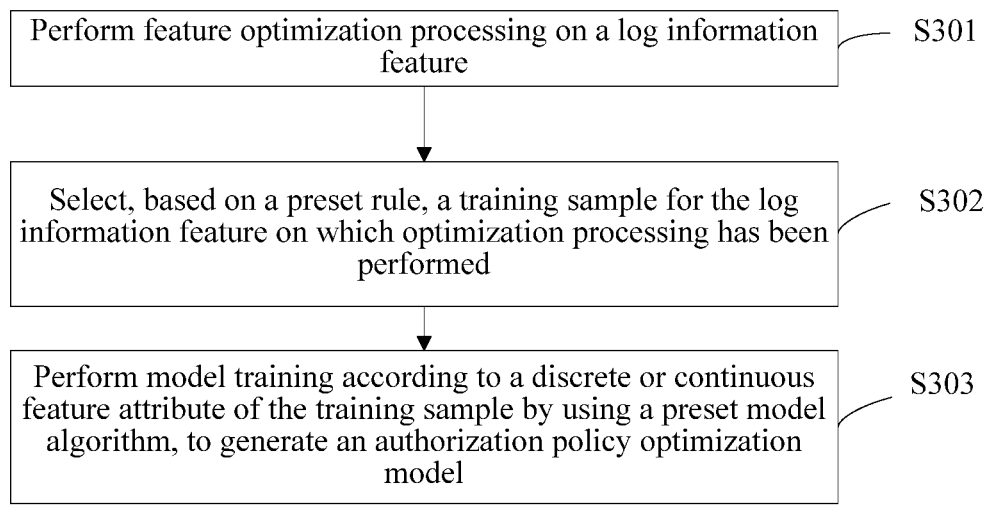
FIG. 3 is a flowchart of step S202 shown in FIG. 2 according to an embodiment.

FIG. 3 is a flowchart of step S202 shown in FIG. 2 according to an embodiment. Step S202 includes:

Step S301: An authorization policy optimization apparatus performs feature optimization processing on a log information feature, for example, feature discrete processing or generating a corresponding combined feature. The combined feature mainly refers to a relationship feature of a user, a resource, and a policy, and the combined feature may enrich and restrict the log information feature.

Step S302: The authorization policy optimization apparatus selects, based on a preset rule, a training sample for the log information feature on which optimization processing has been performed, for example, a positive training sample and a negative training sample. The preset rule herein may be a selection rule, a weighting rule, or the like of the log information feature. For example, if an authorization policy is used for a long time, a high weighted value is set for the authorization policy. If an authorization policy is used for a short time or is frequently updated, the authorization policy may not be selected, or a low weighted value is set.

Step S303: The authorization policy optimization apparatus performs model training according to a discrete or continuous feature attribute of the training sample obtained in step S302 and by using a preset model algorithm (such as a logistic regression linear model algorithm or a gradient boosting decision tree nonlinear model algorithm), to generate an authorization policy optimization model. Subsequently, step S203 is performed.

In step S203, the authorization policy optimization apparatus acquires at least one recommended preset authorization policy of the authorization policy optimization model in step S202. A predicted reasonableness value of the recommended preset authorization policy is greater than a predicted reasonableness value of another preset authorization policy of the authorization policy optimization model. That is, the authorization policy optimization apparatus acquires a positive sample having a high predicted reasonableness value in the authorization policy optimization model, to perform an optimization operation on an authorization policy having a low predicted reasonableness value. Subsequently, step S204 is performed.

In step S204, the authorization policy optimization apparatus performs policy reasonableness prediction on the authorization policy by using the authorization policy optimization model generated in step S202, to obtain a quantitative policy validity probability, that is, a predicted reasonableness value corresponding to the authorization policy having a guiding effect. The authorization policy optimization model in this embodiment may be generated in real time. Therefore, the authorization policy optimization model may be constantly optimized with reference to time attenuation along with accumulation of the preset authorization policy. Subsequently, step S205 is performed.

In step S205, the authorization policy optimization apparatus performs optimization processing on the authorization policy according to the predicted reasonableness value corresponding to the authorization policy that is obtained in step S204. For specifics, refer to FIG. 4.

Figure 4:
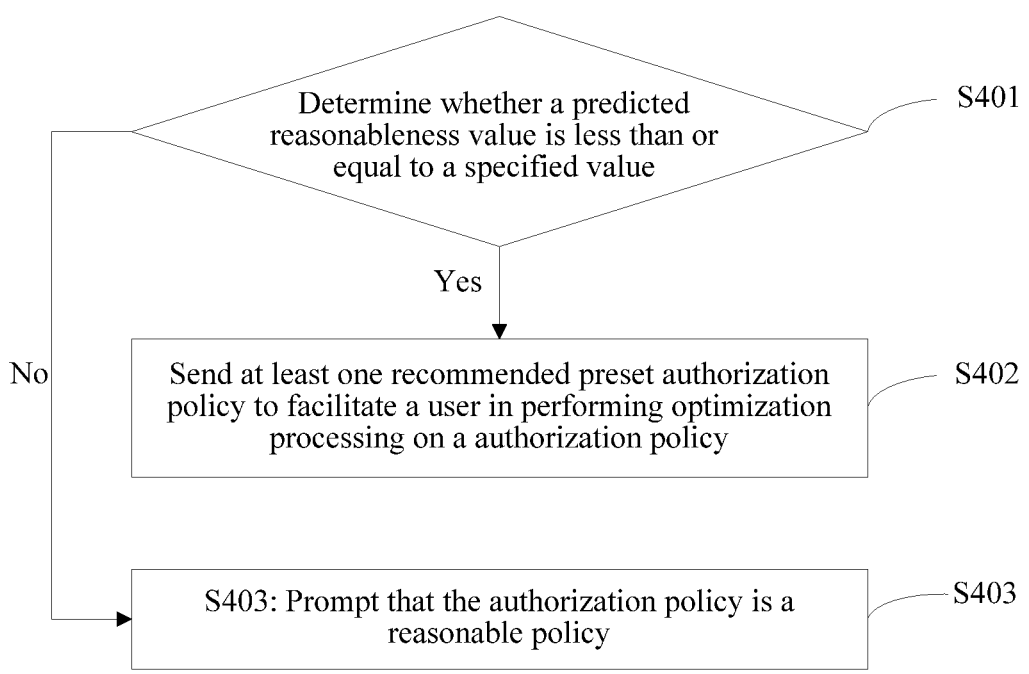
FIG. 4 is a flowchart of step S205 shown in FIG. 2 according to an embodiment.

FIG. 4 is a flowchart of step S205 shown in FIG. 2 according to an embodiment. Step S205 includes:

Step S401: The authorization policy optimization apparatus determines whether the predicted reasonableness value of the authorization policy is less than or equal to a specified value; if the predicted reasonableness value of the authorization policy is less than or equal to the specified value, perform step S402; and if the predicted reasonableness value of the authorization policy is greater than the specified value, perform step S403.

Step S402: The authorization policy optimization apparatus sends the at least one recommended preset authorization policy obtained in step S203 to a user, to facilitate the user in performing optimization processing on the authorization policy.

Step S403: The authorization policy optimization apparatus prompts that the authorization policy is a reasonable policy, and an electronic authentication apparatus may directly perform an authentication operation on the user by using the authorization policy.

In this way, an authorization policy optimization process of the authorization policy optimization method in this embodiment is completed.

Based on the embodiment shown in FIG. 1, in the authorization policy optimization method in this embodiment, the authorization policy optimization model is generated in real time to perform reasonableness prediction on the authorization policy, and optimization processing is performed on the authorization policy by using the recommended preset authorization policy, thereby implementing fine processing of authorization policy optimization. Besides, feature optimization processing is performed on the log information feature, and the training sample is selected by using the preset rule, thereby further improving authorization policy optimization effectiveness.

This application further provides an authorization policy optimization apparatus.

Figure 5:
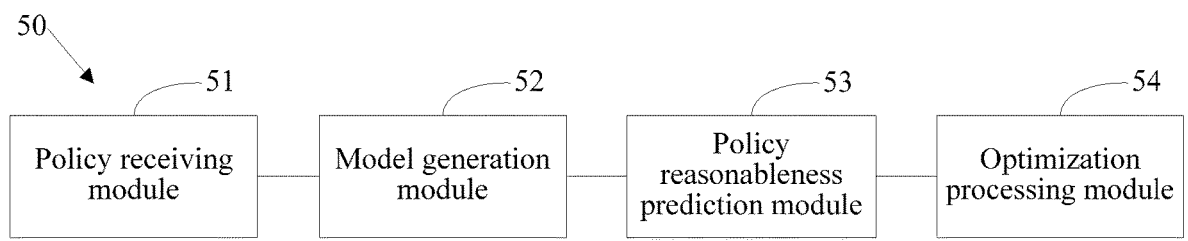
FIG. 5 is a schematic structural diagram of an authorization policy optimization apparatus according to an embodiment.

FIG. 5 is a schematic structural diagram of an authorization policy optimization apparatus according to an embodiment. The authorization policy optimization apparatus in this embodiment may be implemented by using the embodiment of the authorization policy optimization method shown in FIG. 1. The authorization policy optimization apparatus 50 in this embodiment includes a policy receiving module 51, a model generation module 52, a policy reasonableness prediction module 53, and an optimization processing module 54.

The policy receiving module 51 is configured to: receive an authorization policy, and obtain authorization log information of a preset authorization policy according to the authorization policy. The model generation module 52 is configured to: extract a log information feature of the authorization log information, and generate an authorization policy optimization model by using the log information feature of the authorization log information. The policy reasonableness prediction module 53 is configured to perform policy reasonableness prediction on the authorization policy by using the authorization policy optimization model, to obtain a predicted reasonableness value corresponding to the authorization policy. The optimization processing module 54 is configured to perform optimization processing on the authorization policy according to the predicted reasonableness value corresponding to the authorization policy.

When the authorization policy optimization apparatus 50 in this embodiment is used, the policy receiving module 51 first receives the authorization policy inputted by a user. The authorization policy is a policy that the user wants to use to perform an authentication operation on a data access right of the user. However, the user does not know whether the authorization policy is reasonable and whether determining is incorrectly performed or is not performed excessively frequently.

Subsequently, the policy receiving module 51 acquires the authorization log information of the preset authorization policy according to the received authorization policy. The preset authorization policy herein refers to an authorization policy used to establish the authorization policy optimization model. Authorization log information of preset authorization policies may come from an authentication log of an authentication system. That is, history and current authentication logs of a current electronic authentication apparatus are used as reference. Alternatively, the authorization log information may be a service association log of a service server, that is, feedback of a final authorization status by the service server. For example, service data in the service association log of the service server may be accessed abnormally because the authorization policy is set unreasonably.

Then, the model generation module 52 extracts the log information feature of the preset authorization policy obtained by the policy receiving module 51. The log information feature refers to an information feature that may be used to represent the preset authorization policy, and the log information feature includes a user feature, an action feature, an authorization policy feature, an authentication target value feature, and the like.

The user feature may include a user type, user activeness, and the like. The user type may be, for example, an ordinary user, an external user, a cross-account, a sub account, and the like. The user activeness may be a data access frequency of a user. The action feature may include an operation action interface, an operation action geographic location, an operation action type, an authentication type, and the like. The operation action type may be an item to which an operation resource belongs, a cloud service to which an operation resource belongs, and the like. The authentication type includes whether authentication succeeds. The authorization policy feature includes an authorization policy change frequency, an authorization policy quantity, a policy user matching relationship, a policy resource matching relationship, and the like. The policy user matching relationship may be a correspondence between a user and a policy, and the policy resource matching relationship may be a correspondence between a resource and a policy. The authentication target value feature includes whether an authentication result is correct, whether an authentication result changes, and the like.

Subsequently, the model generation module 52 performs training to generate the authorization policy optimization model by using the extracted log information feature of the authorization log information. The authorization policy optimization model may perform policy reasonableness prediction on another authorization policy.

Then, the policy reasonableness prediction module 53 performs policy reasonableness prediction on the authorization policy by using the authorization policy optimization model generated by the model generation module 52, to obtain a quantitative policy validity probability, that is, a predicted reasonableness value corresponding to the authorization policy having a guiding effect. The authorization policy optimization model in this embodiment may be generated in real time. Therefore, the authorization policy optimization model may be constantly optimized with reference to time attenuation along with accumulation of the preset authorization policy.

Finally, the optimization processing module 54 performs optimization processing on the authorization policy according to the predicted reasonableness value corresponding to the authorization policy that is obtained by the policy reasonableness prediction module 53. Specifics are as follows: If the predicted reasonableness value is less than or equal to a specified value, the user is prompted to perform optimization processing on the authorization policy, for example, modify a feature in the authorization policy, to increase the predicted reasonableness value of the authorization policy. If the predicted reasonableness value is greater than the specified value, it is prompted that the authorization policy is a reasonable policy, and an electronic authentication apparatus may directly perform an authentication operation for the user by using the authorization policy.

In this way, an authorization policy optimization process of the authorization policy optimization apparatus 50 in this embodiment is completed.

The authorization policy optimization apparatus in this embodiment generates the authorization policy optimization model in real time to perform reasonableness prediction on the authorization policy, and performs optimization processing on the authorization policy according to the predicted reasonableness value of the authorization policy, thereby implementing fine processing of authorization policy optimization.

Figure 6:
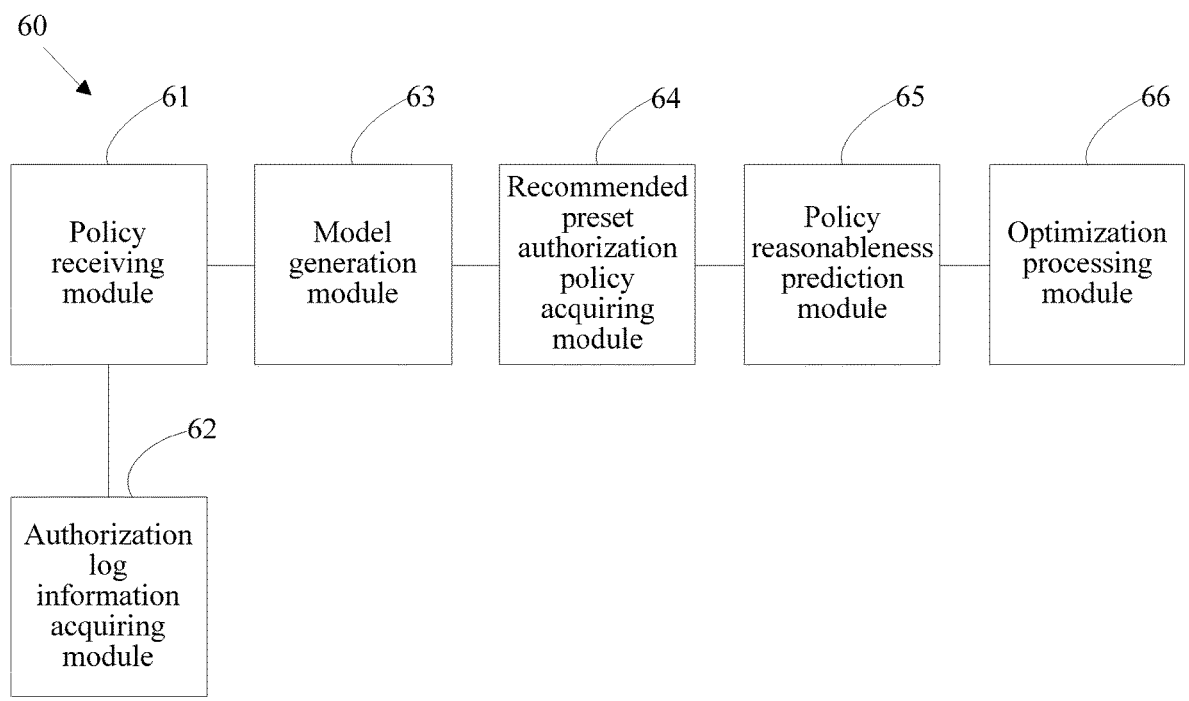
FIG. 6 is a schematic structural diagram of an authorization policy optimization apparatus according to another embodiment.

FIG. 6 is a schematic structural diagram of an authorization policy optimization apparatus according to another embodiment. The authorization policy optimization apparatus in this embodiment may be implemented by using the embodiment of the authorization policy optimization method shown in FIG. 2. The authorization policy optimization apparatus 60 in this embodiment includes: an authorization log information acquiring module 62, a policy receiving module 61, a model generation module 63, a recommended preset authorization policy acquiring module 64, a policy reasonableness prediction module 65, and an optimization processing module 66.

The authorization log information acquiring module 62 is configured to obtain authorization log information of a preset authorization policy by using an authentication log of an authentication system and a service association log of a service server. The policy receiving module 61 is configured to: receive an authorization policy, and obtain the authorization log information of the preset authorization policy according to the authorization policy. The model generation module 63 is configured to: extract a log information feature of the authorization log information, and generate an authorization policy optimization model by using the log information feature of the authorization log information. The recommended preset authorization policy acquiring module 64 is configured to: obtain at least one recommended preset authorization policy of the authorization policy optimization model, in which a predicted reasonableness value of the recommended preset authorization policy is greater than a predicted reasonableness value of another preset authorization policy in the authorization policy optimization model. The policy reasonableness prediction module 65 is configured to perform policy reasonableness prediction on the authorization policy by using the authorization policy optimization model, to obtain a predicted reasonableness value corresponding to the authorization policy. The optimization processing module 66 is configured to perform optimization processing on the authorization policy according to the predicted reasonableness value corresponding to the authorization policy.

Figure 7:
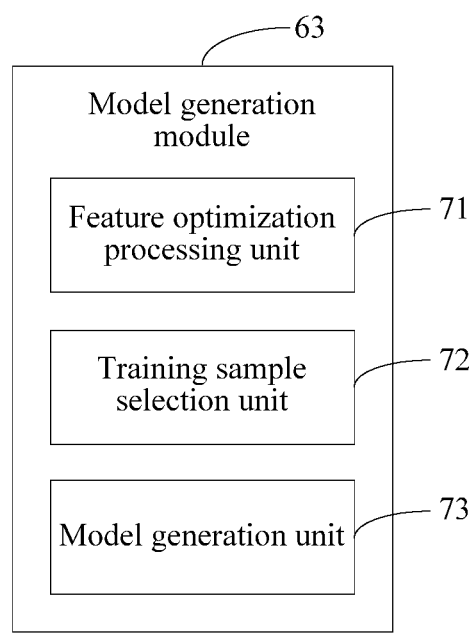
FIG. 7 is a schematic structural diagram of a model generation module in FIG. 6 according to an embodiment.

FIG. 7 is a schematic structural diagram of a model generation module in FIG. 6 according to an embodiment. The model generation module 63 includes a feature optimization processing unit 71, a training sample selection unit 72, and a model generation unit 73.

The feature optimization processing unit 71 is configured to perform feature optimization processing on the log information feature. The training sample selection unit 72 is configured to select, based on a preset rule, a training sample for the log information feature on which optimization processing has been performed. The model generation unit 73 is configured to perform model training according to a discrete or continuous feature attribute of the training sample by using a preset model algorithm, to generate the authorization policy optimization model.

Figure 8:
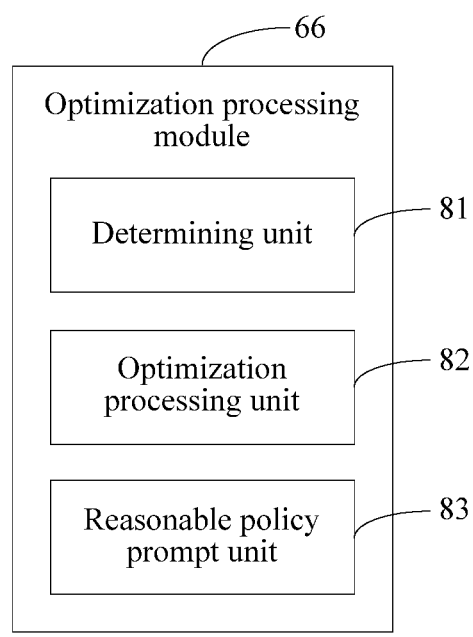
FIG. 8 is a schematic structural diagram of an optimization processing module in FIG. 6 according to an embodiment.

FIG. 8 is a schematic structural diagram of an optimization processing module in FIG. 6 according to an embodiment. The optimization processing module 66 includes a determining unit 81, an optimization processing unit 82, and a reasonable policy prompt unit 83.

The determining unit 81 is configured to determine whether the predicted reasonableness value is less than or equal to a specified value. The optimization processing unit 82 is configured to: if the predicted reasonableness value is less than or equal to the specified value, prompt a user to perform optimization processing on the authorization policy. The at least one recommended preset authorization policy may be sent, so that the user performs optimization processing on the authorization policy. The reasonable policy prompt unit 83 is configured to: if the predicted reasonableness value is greater than the specified value, prompt that the authorization policy is a reasonable policy.

When the authorization policy optimization apparatus 60 in this embodiment is used, the policy receiving module 61 first receives the authorization policy inputted by a user. The authorization policy is a policy that the user wants to use to perform an authentication operation on a data access right of the user. However, the user does not know whether the authorization policy is reasonable and whether determining is incorrectly performed or is not performed excessively frequently.

Subsequently, the authorization log information acquiring module 62 obtains authorization log information of a preset authorization policy by using an authentication log of an authentication system and a service association log of a service server. The policy receiving module 6 obtains the authorization log information of the preset authorization policy according to the received authorization policy.

Then, the model generation module 63 extracts the log information feature of the authorization log information of the preset authorization policy obtained by the policy receiving module 61. The log information feature refers to an information feature that may be used to represent the preset authorization policy, and the log information feature includes a user feature, an action feature, an authorization policy feature, an authentication target value feature, and the like.

Subsequently, the model generation module 63 performs training to generate the authorization policy optimization model by using the extracted log information feature of the authorization log information. The authorization policy optimization model may perform policy reasonableness prediction on another authorization policy. A step of generating the authorization policy optimization model includes:

The feature optimization processing unit 71 of the model generation module 63 performs feature optimization processing on the log information feature, for example, feature discrete processing, generating a corresponding combined feature, and the like. The combined feature mainly refers to a relationship feature of a user, a resource, and a policy, and the combined feature may enrich and restrict the log information feature.

The training sample selection unit 72 of the model generation module 63 selects, based on a preset rule, a training sample, for example, a positive training sample and a negative training sample for the log information feature on which optimization processing has been performed. The preset rule herein may be a selection rule, a weighting rule, or the like of the log information feature. For example, if an authorization policy is used for a long time, a high weighted value is set for the authorization policy. If an authorization policy is used for a short time or is frequently updated, the authorization policy may not be selected, or a low weighted value is set.

The model generation unit 73 of the model generation module 63 performs model training according to a discrete or continuous feature attribute of the training sample obtained by the training sample selection unit 72 and by using a preset model algorithm (such as a logistic regression linear model algorithm or a gradient boosting decision tree nonlinear model algorithm), to generate the authorization policy optimization model.

Then, the recommended preset authorization policy acquiring module 64 obtains at least one recommended preset authorization policy of the authorization policy optimization model generated by the model generation module 63, in which a predicted reasonableness value of the recommended preset authorization policy is greater than a predicted reasonableness value of another preset authorization policy in the authorization policy optimization model. That is, the recommended preset authorization policy acquiring module 64 obtains a positive sample having a high predicted reasonableness value in the authorization policy optimization model, to perform an optimization operation on an authorization policy having a low predicted reasonableness value.

Then, the policy reasonableness prediction module 65 performs policy reasonableness prediction on the authorization policy by using the authorization policy optimization model generated by the model generation module 63, to obtain a quantitative policy validity probability, that is, a predicted reasonableness value corresponding to the authorization policy having a guiding effect. The authorization policy optimization model in this embodiment may be generated in real time. Therefore, the authorization policy optimization model may be constantly optimized with reference to time attenuation along with accumulation of the preset authorization policy.

Finally, the optimization processing module 66 performs optimization processing on the authorization policy according to the predicted reasonableness value corresponding to the authorization policy that is obtained by the policy reasonableness prediction module 65. Specifics are as follows:

The determining unit 81 of the optimization processing module 66 determines whether the predicted reasonableness value of the authorization policy is less than or equal to a specified value. If the predicted reasonableness value is less than or equal to the specified value, the optimization processing unit 82 sends the at least one recommended preset authorization policy to the user, to facilitate the user in performing optimization processing on the authorization policy. If the predicted reasonableness value is greater than the specified value, the reasonable policy prompt unit 83 prompts that the authorization policy is a reasonable policy, and an electronic authentication apparatus may directly perform an authentication operation on the user by using the authorization policy.

In this way, an authorization policy optimization process of the authorization policy optimization apparatus 60 in this embodiment is completed.

Based on the embodiment shown in FIG. 5, the authorization policy optimization apparatus in this embodiment generates the authorization policy optimization model in real time to perform reasonableness prediction on the authorization policy, and performs optimization processing on the authorization policy by using the recommended preset authorization policy, thereby implementing fine processing of authorization policy optimization. Besides, feature optimization processing is performed on the log information feature, and the training sample is selected by using the preset rule, thereby further improving authorization policy optimization effectiveness.

The following describes a working principle of the authorization policy optimization method and the authorization policy optimization apparatus of this application by using an embodiment.

Figure 9:
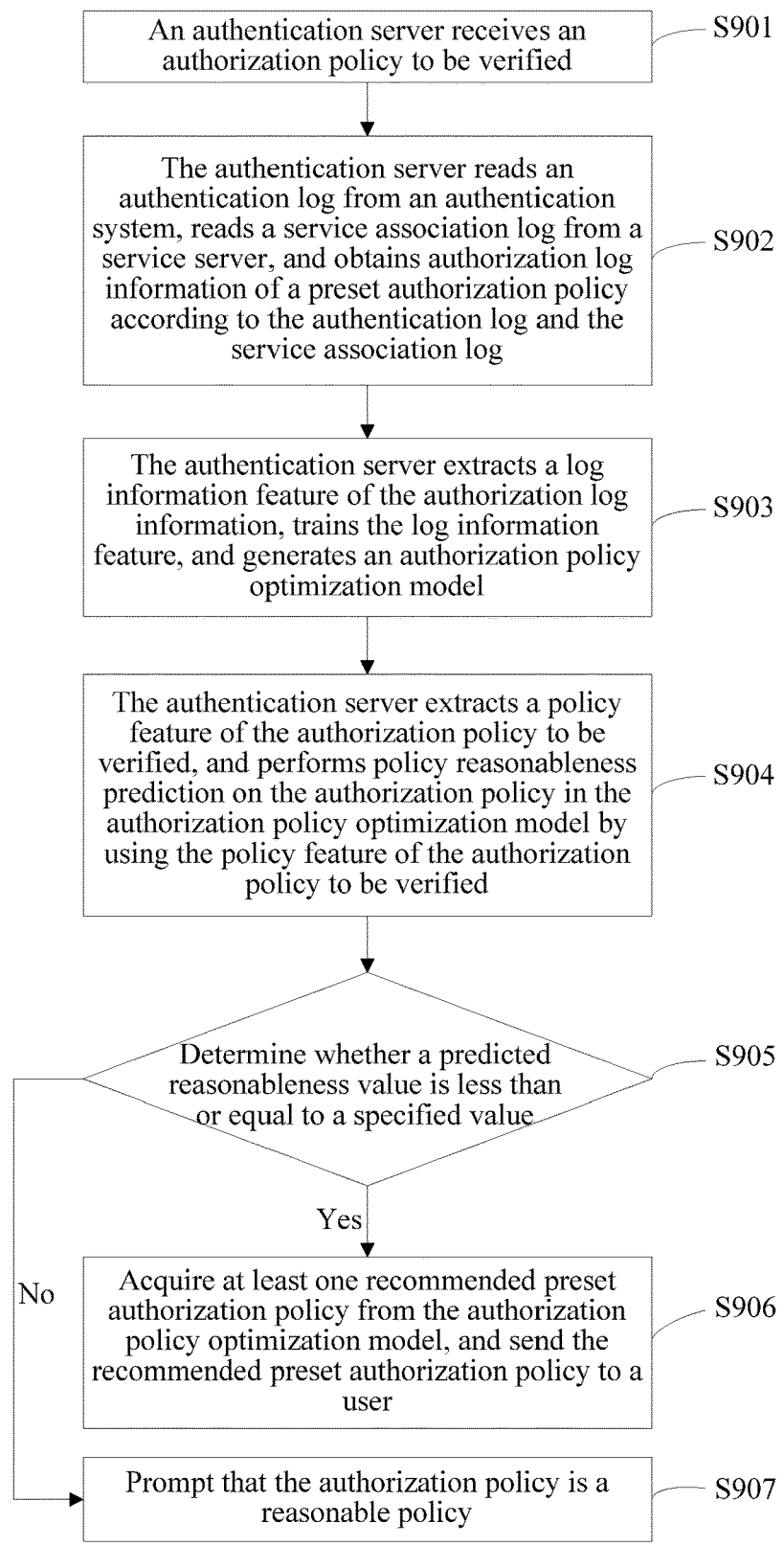
FIG. 9 is a flowchart of use of an authorization policy optimization method and an authorization policy optimization apparatus according to an embodiment.

FIG. 9 is a flowchart of use of an authorization policy optimization method and an authorization policy optimization apparatus according to an embodiment. The authorization policy optimization apparatus of this embodiment is disposed in an authentication server, to perform authorization verification on a user accessing a cloud server. The authorization policy optimization procedure of this embodiment includes:

Step S901: An authentication server receives an authorization policy to be verified.

Step S902: The authentication server reads an authentication log from an authentication system, reads a service association log from a service server, and acquires authorization log information of a preset authorization policy according to the authentication log and the service association log.

Step S903: The authentication server extracts a log information feature (a policy feature) of the authorization log information, trains the log information feature, and generates an authorization policy optimization model.

Step S904: The authentication server extracts a policy feature of the authorization policy to be verified, and performs policy reasonableness prediction on the authorization policy in the authorization policy optimization model by using the policy feature of the authorization policy to be verified, to obtain a predicted reasonableness value corresponding to the authorization policy.

Step S905: Determine whether the predicted reasonableness value is less than or equal to a specified value; if the predicted reasonableness value is less than or equal to the specified value, perform step S906; and if the predicted reasonableness value is greater than the specified value, perform step S907.

Step S906: Acquire at least one recommended preset authorization policy having a relatively high predicted reasonableness value from the authorization policy optimization model, and send the recommended preset authorization policy to a user to perform authorization policy optimization.

Step S907: Prompt that the authorization policy is a reasonable policy.

In this way, the authorization policy optimization process of the authorization policy optimization method and the authorization policy optimization apparatus of this embodiment is completed.

The authorization policy optimization method and the authorization policy optimization apparatus of this application generate the authorization policy optimization model in real time to perform reasonableness prediction on the authorization policy, and perform optimization processing on the authorization policy by using the recommended preset authorization policy. This implements fine processing of authorization policy optimization, and resolves a technical problem that an existing authorization policy optimization method and authorization policy optimization apparatus cannot perform fine authorization policy optimization.

Terms "component," "module," "system," "interface," "process," and the like used in this application refer to computer-related entities: hardware, a combination of hardware and software, and software or executed software. For example, a component may be, but not limited to, a process running on a processor, a processor, an object, an executable application, an executed thread, a program, and/or a computer. With reference to the drawings, an application running on a controller and the controller may both be components. One or more components may be in an executed process and/or thread and the components may be located on one computer and/or distributed between or among two or more computers.

Figure 10:
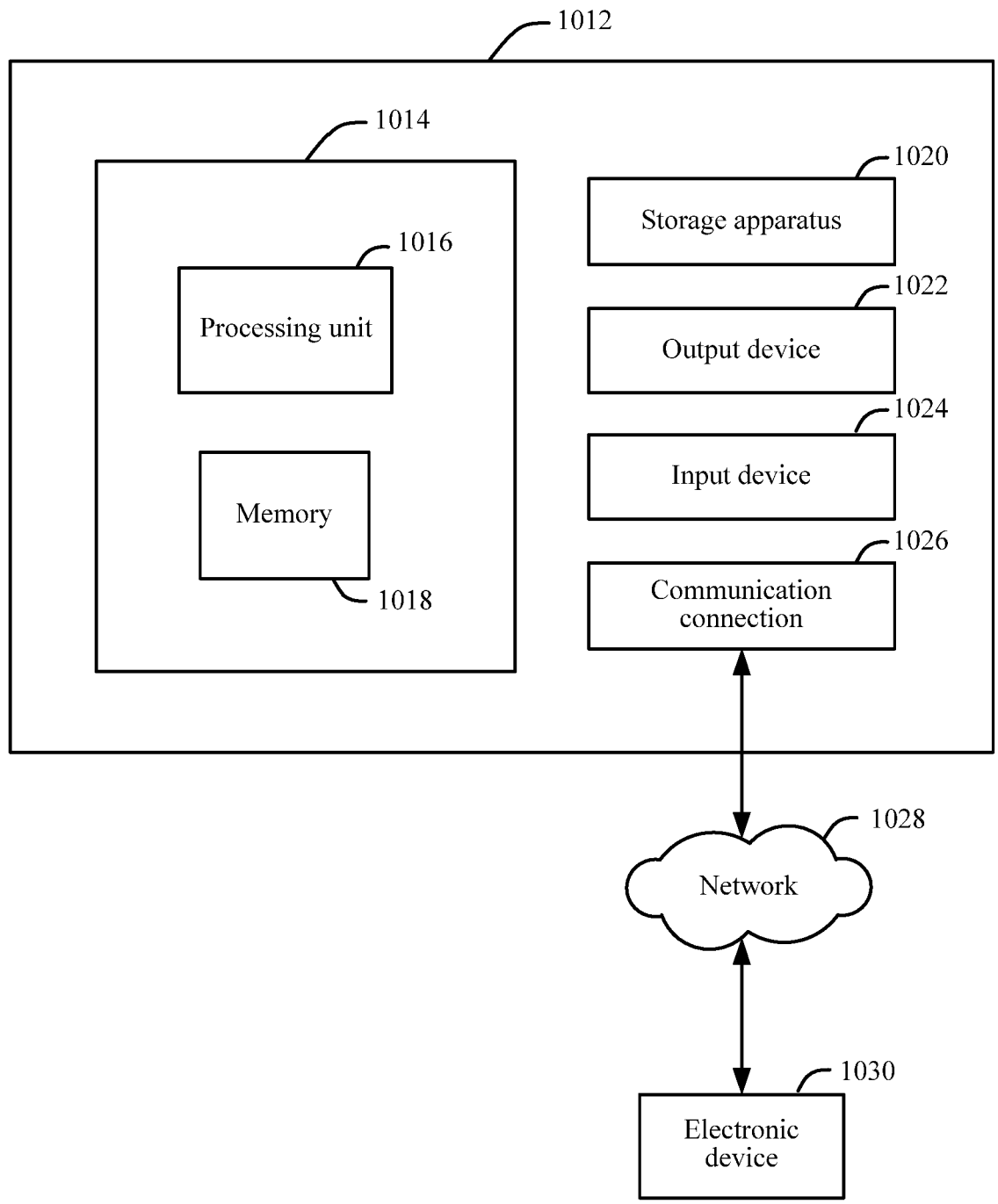
FIG. 10 is a schematic structural diagram of a working environment of an electronic device in which an authorization policy optimization apparatus is located according to an embodiment.

FIG. 10 is a schematic structural diagram of a working environment of an electronic device in which an authorization policy optimization apparatus is located according to an embodiment. The working environment of FIG. 10 is only an example of a proper working environment, and is not intended to suggest any limitation on the scope of purposes or functions of the working environment. The electronic device 1012 includes, but is not limited to, a wearable device, a head-mounted device, a medical treatment health platform, a personal computer, a server computer, a handheld or laptop device, a mobile device (for example, a mobile phone, a personal digital assistant (PDA), or a media player), a multiprocessor system, a consumer electronic device, a small computer, a mainframe computer, and a distributed computing environment including any of the foregoing systems or devices.

Although not required, the embodiments are described in a background in which "a computer readable instruction" is executed by one or more electronic devices. The computer-readable instruction may be distributed by a computer-readable medium (discussed below). The computer readable instruction may be implemented as a program module, for example, a function, an object, an application programming interface (API), or a data structure for executing a task or implementing an abstract data type. Functions of the computer readable instruction may be randomly combined or distributed in various environments.

FIG. 10 shows an example of an electronic device 1012 including an authorization policy optimization apparatus of this application according to one or more embodiments. The electronic device 1012 is a representation form of a computing device. In a configuration, the electronic device 1012 includes at least one processing unit 1016 and a memory 1018. According to an exact configuration and type of the electronic device, the memory 1018 may be volatile (such as a RAM) or non-volatile (such as a ROM or a flash memory) or a combination thereof. The configuration is indicated by a dashed line 1014 in FIG. 10.

In another embodiment, the electronic device 1012 may include an additional feature and/or function. For example, the device 1012 may further include an additional storage apparatus (for example, removable and/or non-removable), including, but not limited to, a magnetic storage apparatus, an optical storage apparatus, or the like. The additional storage apparatus is shown as a storage apparatus 1020 in FIG. 10. In an embodiment, a computer readable instruction used to implement the authorization policy optimization method of one or more embodiments of this specification may be stored in the storage apparatus 1020. The storage apparatus 1020 may further store another computer readable instruction used to implement an operating system, an application program, and the like. The computer readable instruction may be loaded in the memory 1018 and executed by, for example, the processing unit 1016. When the processing unit 1016 executes the computer readable instruction, the function of each module and unit in FIG. 5 to FIG. 8 can be implemented.

A term "computer readable medium" used in this specification includes a computer storage medium. The computer storage medium includes volatile and non-volatile media, and removable and non-removable media that are implemented by using any method or technology and that are used for storing information such as a computer readable instruction or other data. The memory 1018 and the storage apparatus 1020 are examples of the computer storage medium. The computer storage medium includes, but is not limited to, a RAM, a ROM, an EEPROM, a flash memory or another memory technology, a CD-ROM, a digital versatile disc (DVD) or another optical storage apparatus, a cassette, a magnetic tape, a magnetic disk storage apparatus or another magnetic storage device, or any other medium that may be configured to store expected information and may be accessed by the electronic device 1012. Any such computer storage medium may be a part of the electronic device 1012.

The electronic device 1012 may further include a communication connection 1026 allowing the electronic device 1012 to communicate with another device. The communication connection 1026 may include, but is not limited to, a modem, a network interface card (NIC), an integrated network interface, a radio frequency transmitter/receiver, an infrared port, a USB connection, or another interface configured to connect the electronic device 1012 to another electronic device. The communication connection 1026 may include a wired connection or a wireless connection. The communication connection 1026 may transmit and/or receive communication media.

The term "computer readable medium" may include a communication The communication medium includes a computer readable instruction or other data in a "modulated data signal" such as a carrier or another transmission mechanism, and includes any information transfer medium. The term "modulated data signal" may include such a signal: one or more features of the signal are set or changed in a manner of encoding information to a signal.

The electronic device 1012 may include an input device 1024 such as a keyboard, a mouse, a pen, an audio input device, a touch input device, an infrared camera, and a video input device and/or any other input device. The device 1012 may also include an output device 1022 such as one or more displays, a speaker, and a printer and/or any other output device. The input device 1024 and the output device 1022 may be connected to the electronic device 1012 by using a wired connection, a wireless connection, or any combination thereof. In an embodiment, an input device or an output device of another electronic device may be used as the input device 1024 or the output device 1022 of the electronic device 1012.

Components of the electronic device 1012 may be connected by using various interconnections (for example, a bus). The interconnections include a peripheral component interconnect (PCI) (for example, a fast PCI), a universal serial bus (USB), a live line (IEEE 1394), an optical bus structure, and the like. In another embodiment, the components of the electronic device 1012 may be interconnected by using a network. For example, the memory 1018 may include multiple physical memory units located in different physical locations and interconnected by using a network.

A person skilled in the art knows that a storage device configured to store a computer readable instruction may be distributed across networks. For example, the electronic device 1030 that may be accessed by using a network 1028 may store a computer readable instruction used to implement the authorization policy optimization method of one or more embodiments of this application. The electronic device 1012 may access the electronic device 1030 and download some or all computer readable instructions for execution. Alternatively, the electronic device 1012 may download multiple computer readable instructions according to a requirement, or some instructions may be executed in the electronic device 1012 and some instructions may be executed in the electronic device 1030.

This specification provides various operations of embodiments. In an embodiment, the one or more operations may constitute computer-readable instructions stored on one or more computer-readable media, and the computer-readable instructions enable a computing device to perform the operations of the authorization policy optimization method when the computer-readable instructions are executed by an electronic device. Describing a sequence of some or all operations shall not be interpreted as implying that the operations are sequentially related. A person skilled in the art will understand an alternative sequence having the benefits of the present specification. Moreover, not all operations necessarily exist in each embodiment provided in the present specification.

Furthermore, although the disclosure is shown and described by using one or more implementation manners, a person skilled in the art may conceive of equivalent variations and modifications based on reading and understanding on the specification and the accompany drawings. The disclosure includes all such variations and modifications, which is only limited by the scope of the appended claims. Functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the implementation manners in the specification shown in the specification. In addition, although features of the specification are disclosed with respect to only one of several implementation manners, the features may be combined with one or more other features of other implementation manners that are desirable for and advantageous to a given application. Besides, when terms "include," "contain," "include," or variations thereof are used in implementations or claims, the terms are intended to indicate meaning similar to that of the term "include."

Functional units according to the embodiments may be integrated in one processing module or exist as separate physical units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium. The aforementioned storage medium may be a read-only memory, a magnetic disk or an optical disc. The foregoing apparatuses or systems can execute methods in corresponding method embodiments.

In conclusion, although this application discloses the embodiments as above, the above embodiments are not intended to limit this application. A person of ordinary skill in the art may make various modifications and embellishments without departing from the spirit and scope of this application. Therefore, the protection scope of this application is subject to the claims.

What is claimed is:

1. An authorization policy optimization method being performed by a computing device comprising at least one processor, the authorization policy optimization method comprising:
receiving an authorization policy to be used to perform an authentication on a data access right of a user;
obtaining authorization log information of a first preset authorization policy, from the received authorization policy;
extracting a log information feature, from the obtained authorization log information;
performing a feature optimization processing on the extracted log information feature;
selecting, based on a preset rule, a training sample for the log information feature on which the feature optimization processing is performed;
inputting, into a preset model, the selected training sample, to generate an authorization policy optimization model for outputting an output value corresponding to an input authorization policy;
inputting the received authorization policy into the generated authorization policy optimization model, to obtain a predicted value corresponding to the received authorization policy;
determining whether the obtained predicted value is less than or equal to a specified value;
based on the predicted value being determined to be less than or equal to the specified value, prompting the user to perform an optimization processing on the authorization policy; and
based on the predicted value being determined to be greater than the specified value, prompting the user that the authorization policy is a reasonable policy.

2. The authorization policy optimization method according to claim 1, further comprising:
obtaining, from the generated authorization policy optimization model, a recommended preset authorization policy having a first predicted value greater than a second predicted value of a second preset authorization policy in the authorization policy optimization model;
determining whether the first predicted value is less than or equal to the specified value;
based on the first predicted value being determined to be less than or equal to the specified value, prompting the user with the recommended preset authorization policy, to facilitate the user in the performing the optimization processing on the authorization policy; and
based on the second predicted value being determined to be greater than the specified value, prompting the user that the authorization policy is the reasonable policy.

3. The authorization policy optimization method according to claim 1, wherein the obtaining the authorization log information obtaining the authorization log information of the first preset authorization policy, from an authentication log of an authentication system and a service association log of a service server.

4. The authorization policy optimization method according to claim 1, wherein the log information feature comprises any one or any combination of a user feature, a behavior feature, an authorization policy feature, and an authentication target value feature.

5. An authorization policy optimization apparatus comprising:
at least one memory configured to store computer program code; and
at least one processor configured to access the at least one memory and operate according to the computer program code, the computer program code comprising:
policy receiving code configured to cause the at least one processor to:
receive an authorization policy to be used to perform an authentication on a data access right of a user;
obtain authorization log information of a first preset authorization policy, from the received authorization policy; and
extract a log information feature, from the obtained authorization log information;
model generation code configured to cause the at least one processor to:
perform a feature optimization processing on the extracted log information feature;
select, based on a preset rule, a training sample for the log information feature on which the feature optimization processing is performed;
input, into a preset model, the selected training sample, to generate an authorization policy optimization model for outputting an output value corresponding to an input authorization policy;
policy prediction code configured to cause the at least one processor to input the received authorization policy into the generated authorization policy optimization model, to obtain a predicted value corresponding to the received authorization policy; and
optimization processing code configured to cause the at least one processor to:
determine whether the obtained predicted value is less than or equal to a specified value;
based on the predicted value being determined to be less than or equal to the specified value, prompt the user to perform an optimization processing on the authorization policy; and
based on the predicted value being determined to be greater than the specified value, prompt the user that the authorization policy is a reasonable policy.

6. The authorization policy optimization apparatus according to claim 5, further comprising recommended preset authorization policy acquiring code configured to cause the at least one processor to obtain, from the generated authorization policy optimization model, a recommended preset authorization policy having a first predicted value greater than a second predicted value of a second preset authorization policy in the authorization policy optimization model,
wherein the optimization processing code is further configured to cause the at least one processor to:
determine whether the first predicted value is less than or equal to the specified value;
based on the first predicted value being determined to be less than or equal to the specified value, prompting the user with the recommended preset authorization policy, to facilitate the user in the performing the optimization processing on the authorization policy; and
based on the second predicted value being determined to be greater than the specified value, prompting the user that the authorization policy is the reasonable policy.

7. The authorization policy optimization apparatus according to claim 5, wherein the policy receiving code is further configured to cause the at least one processor to:
obtain the authorization log information of the first preset authorization policy, from an authentication log of an authentication system and a service association log of a service server.

8. The authorization policy optimization apparatus according to claim 5, wherein the log information feature comprises any one or any combination of a user feature, a behavior feature, an authorization policy feature, and an authentication target value feature.

9. A non-transitory computer-readable storage medium storing instructions that cause at least one processor of to:
receive an authorization policy to be used to perform an authentication on a data access right of a user;
obtain authorization log information of a first preset authorization policy, from the received authorization policy;
extract a log information feature, from the obtained authorization log information;
perform a feature optimization processing on the extracted log information feature;

select, based on a preset rule, a training sample for the log information feature on which the feature optimization processing is performed;
input, into a preset model, the selected training sample, to generate an authorization policy optimization model for outputting an output value corresponding to an input authorization policy;
input the received authorization policy into the generated authorization policy optimization model, to obtain a predicted value corresponding to the received authorization policy;
determine whether the obtained predicted value is less than or equal to a specified value;
based on the predicted value being determined to be less than or equal to the specified value, prompt the user to perform the optimization processing on the authorization policy; and
based on the predicted value being determined to be greater than the specified value, prompt the user that the authorization policy is a reasonable policy.

10. The non-transitory computer-readable storage medium according to claim 9, wherein the instructions further cause the at least one processor to:
obtain, from the generated authorization policy optimization model, a recommended preset authorization policy having a first predicted value greater than a second predicted value of a second preset authorization policy in the authorization policy optimization model;
determine whether the first predicted value is less than or equal to the specified value;
based on the first predicted value being determined to be less than or equal to the specified value, prompt the user with the recommended preset authorization policy, to facilitate the user in the performing the optimization processing on the authorization policy; and
based on the second predicted value being determined to be greater than the specified value, prompt the user that the authorization policy is the reasonable policy.

11. The non-transitory computer-readable storage medium according to claim 9, wherein the instructions further cause the at least one processor to obtain the authorization log information of the first preset authorization policy, from an authentication log of an authentication system and a service association log of a service server.

12. The non-transitory computer-readable storage medium according to claim 9, wherein the log information feature comprises any one or any combination of a user feature, a behavior feature, an authorization policy feature, and an authentication target value feature.

* * * * *